INVENTOR
G. VALENSI
By
Holcombe, Wetherill & Brisebois
ATTYS.

Inventor
G. Valensi
By Holcombe, Wetherill & Brisebois
Attorneys

INVENTOR
G. VALENSI
By Holcombe, Wetherill & Brisebois
ATTYS.

INVENTOR
G. VALENSI
By Holcombe, Wetherill & Brisebois
ATTYS.

INVENTOR
G. VALENSI
By Holcombe, Wetherill & Brisebois
ATTYS.

Inventor
G. Valensi
By
Holcombe, Wetherill & Brisebois
Attorneys 3,157,736

ELECTRONIC DEVICE FOR SYNCHRONIZING COLOUR TELEVISION RECEIVERS

Georges Valensi, 3 Rue des Chaudronniers, Geneva, Switzerland

Filed Oct. 31, 1962, Ser. No. 234,367
Claims priority, application France Feb. 28, 1962
5 Claims. (Cl. 178—5.4)

Figure 3A:
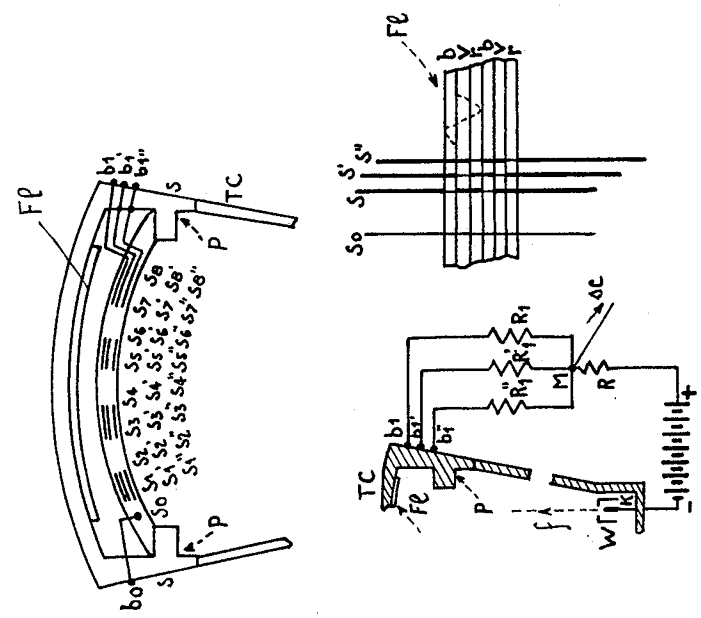

Colour television viewing cathode ray tubes having a fluorescent screen made of successive triplets of fine stripes of red, green and blue aluminum backed phosphors have been produced, but this production has not been much developed for the following reasons.

The Philco Corporation, in the United States of America, has produced a so-called "Apple tube" having a fluorescent screen made of vertical stripes of red, green and blue phosphors horizontally scanned by an electron beam, called a "Writing beam," the intensity of which is sequentially modulated by the received primary colour signals. The information concerning the whereabouts of this writing beam (so-called "index signal") is obtained by stripes of a material having higher secondary electron emission ratio than aluminium, and accurately located behind every red phosphor stripe. In a more recent type of "Apple tube," the indexing stripes employ a phosphor producing ultra-violet radiation picked up by a photomultiplier viewing the rear side of the phosphor screen, and these indexing stripes must be accurately placed after each pair of colour phosphor stripes. An ambiguity therefore exists which is resolved by providing a special index structure at the start of each horizontal line scan. In both cases the fluorescent screen is obviously difficult to manufacture, and therefore costly. In the first case (indexing based on secondary electron emission) it is not possible to use directly the secondary emission current as an index signal, because the writing beam produces an alternating current component at the same frequency as the desired index signal and at *any* phase with respect to it. This necessitates having:

(1) A "pilot beam" deriving the indexing information, accurately aligned with the writing beam so that both strike always the same colour stripe of the fluorescent screen, and this complicates the yoke and the focuser, and (2) An intricate "indexing system" based on frequency separation with a local oscillator of high stability and a critical side band amplifier rejecting unwanted writing beam interference, and yet having a time delay sufficiently short to permit some horizontal sweep non-linearity without too much colour non-uniformity when a solid colour field has to be produced.

In the second case (indexing based on ultra-violet radiation), the photo-multiplier is included in a loop developing a final chrominance signal whose frequency is a difference between the index signal and a chrominance signal previously modified in frequency. This loop must be accurately phase-compensated in order that the static phase shift versus frequency characteristics of its two branches accurately cancel each other. In this case, there is only one electron beam but it must keep, at all times, a minimum intensity and this limits substantially the contrast obtainable in the coloured television pictures.

In the first type of tri-colour cathode ray tube produced by the Chromatic Television Laboratories in the United States of America, and called "Chromatron," the stripes of red, green and blue phosphors are horizontal and are scanned horizontally by a "wobbling" electron beam passing between the wires of two interlaced metallic "combs." The wires of one comb must be accurately located behind each red phosphor stripe, whereas the wires of the other comb must be accurately located behind each blue phosphor stripe, and none should be behind a green phosphor stripe. The wires behind the red phosphors are electrically tied together and brought out to a single terminal (*r*) at the side of the cathode ray tube. Likewise the wires behind the blue phosphors are connected to another external terminal (*b*). Between the electrical center of this double wire grid and the aluminium coating of the phosphors is applied a focusing and accelerating voltage making a series of "electron lenses" in the front section of the tube. Between terminals (*r*) and (*b*) is applied a high-frequency voltage for deflecting the focused electron beam upwards or downwards to obtain a red or a blue colour. A green colour is obtained when no difference of potentials exists between terminals (*r*) and (*b*). As the adjacent wires of these two interlaced metallic combs are rather long (60 centimeters) and very close together, the electric capacity between these terminals (*r* and *b*) is very great, which necessitates, for switching the electron beam from one phosphor stripe to another, a great power (some 40 watts) at a high frequency (several megacycles per second), and this in turn involves a large expense. Also the correct positioning of the numerous metallic wires behind the phosphor stripes involves manufacturing difficulties.

The present invention permits the use of cheaper colour television viewing tubes including—besides an ordinary electron-gun and a tri-colour viewing plate easily manufactured by known printing techniques—only one grid made of only a few wires parallel to the end wall of the tube bearing said tri-colour fluorescent screen, and hereinafter called a "viewing panel."

The object of the present invention is an electronic synchronizing device using these few wires for timing the scanning motion of the electron beam striking them one after the other, so that timing pulses are produced at external terminals. These few wires mark the geometry of the tri-colour fluorescent screen. The geometry of the scene being scanned at the distant television transmitting station is marked by the received line synchronizing pulses, which are in correlation with the colour sub-carrier generated at said transmitting station. The "colour burst," received during the back-porch of each line synchronizing pulse, synchronizes (with this distant sub-carrier-generator) the local oscillator reproducing the sub-carrier at the receiving station. As this latter synchronization is very accurate, both in frequency and in phase, it is possible to employ the front of the line synchronizing pulses as a reference for the geometry of the televised scene—to employ the local oscillator of the receiving station as a "basic clock," and to employ, as "timing marks" for the motion of the scanning electron beam, the timing pulses produced at the external terminals connected to the above mentioned few wires. These timing pulses are compared to corresponding reference pulses produced by a counter energized by the local oscillator acting as basic clock. From this comparison is derived a "correcting signal" for controlling the modulation of the intensity of the electron beam by received (blue, green and red) colour television primary signals derived from the received composite video signal by the receiver demodulator, in the case of a fluorescent screen made of vertical stripes of blue, green and red phosphors horizontally scanned. In the case of a fluorescent screen made of horizontal stripes of blue, green and red phosphors horizontally scanned by a "wobbling" electron beam, this correcting signal controls the magnetic field producing the wobbling of said electron beam.

Figure 1:
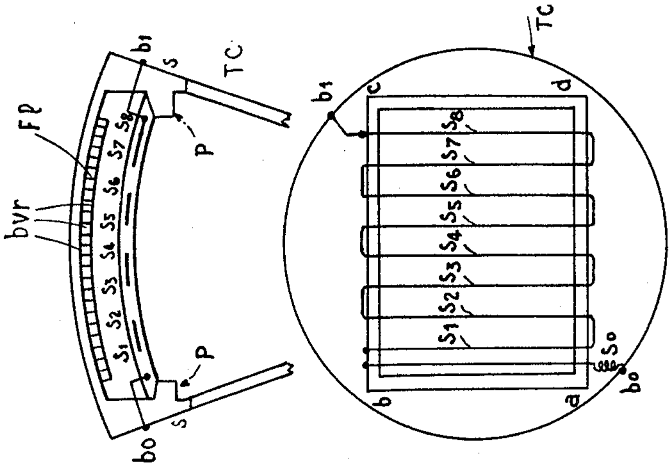
Figure 2:
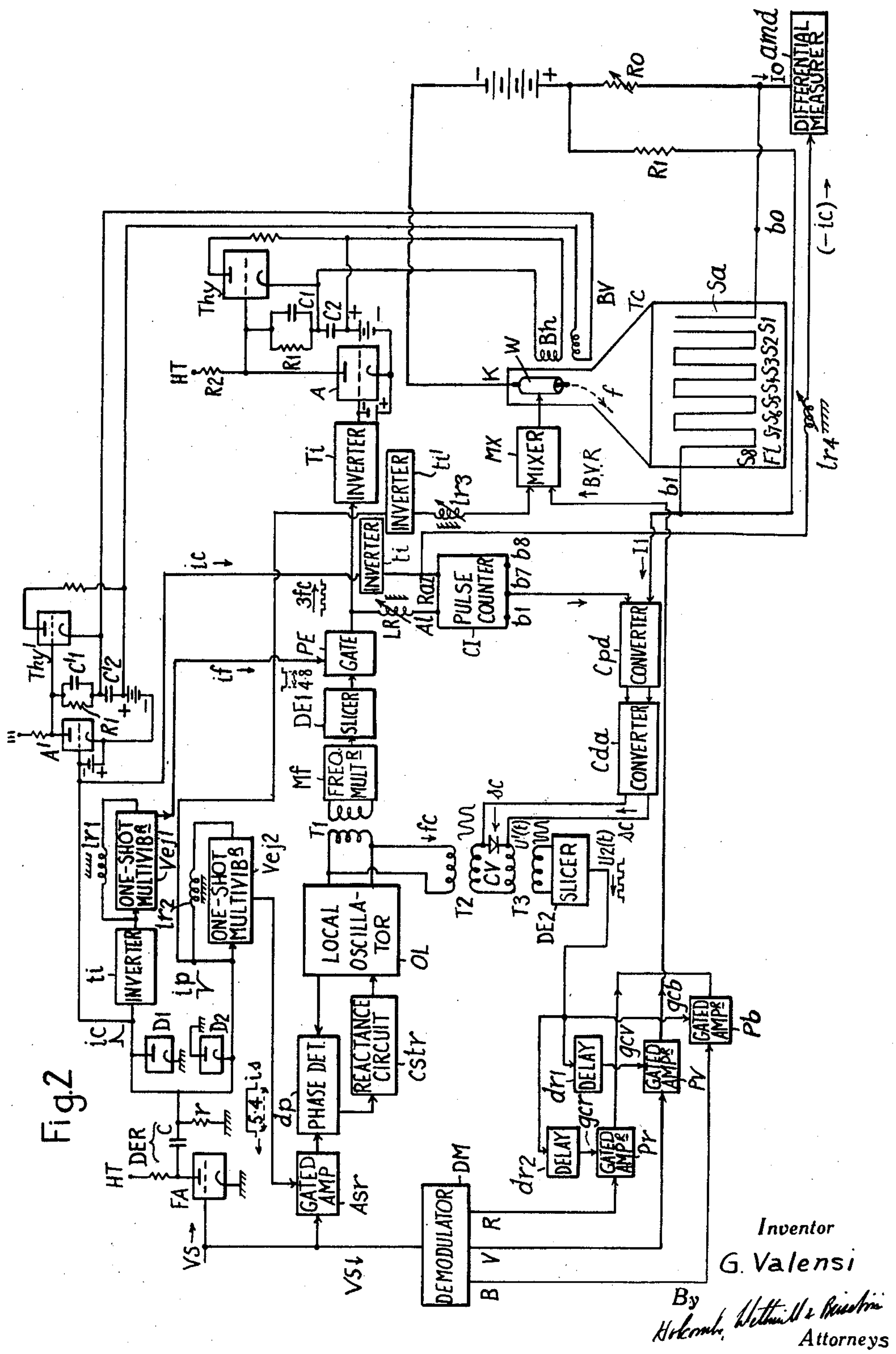
Figure 2A:
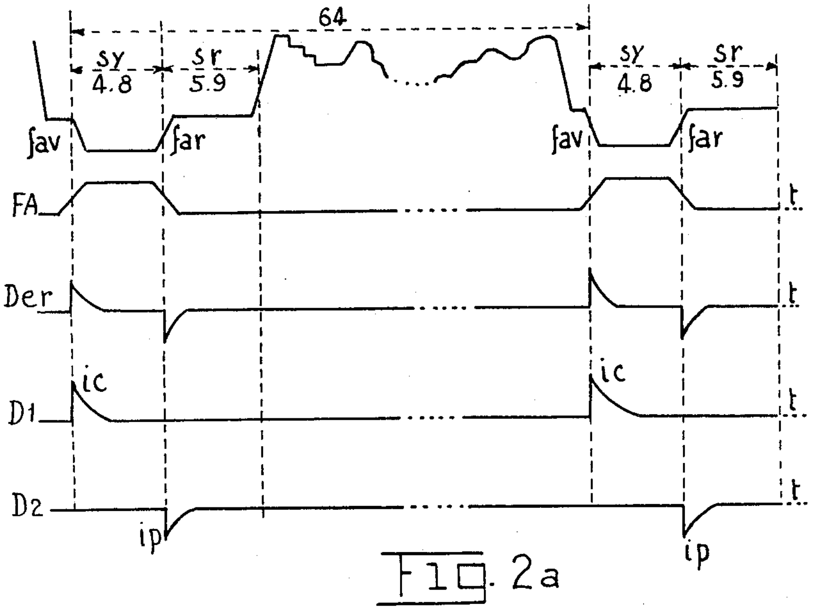
Figure 2C:
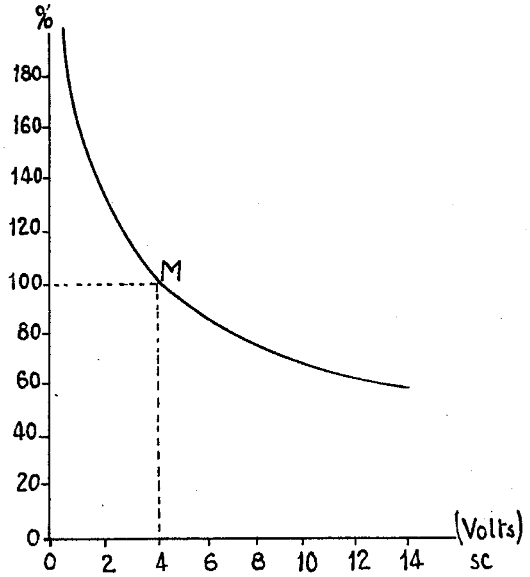
Figure 2B:
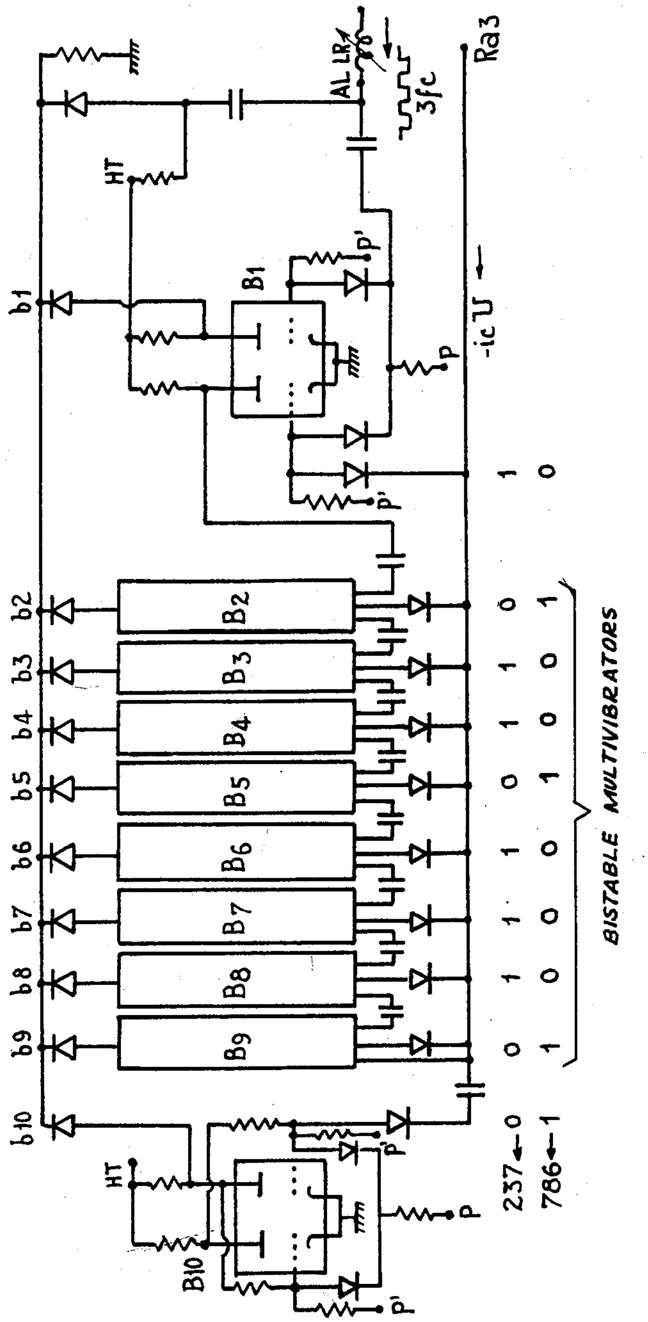
Figure 2D:
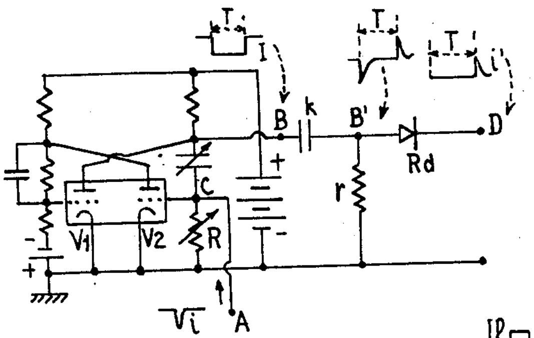
Figure 2E:
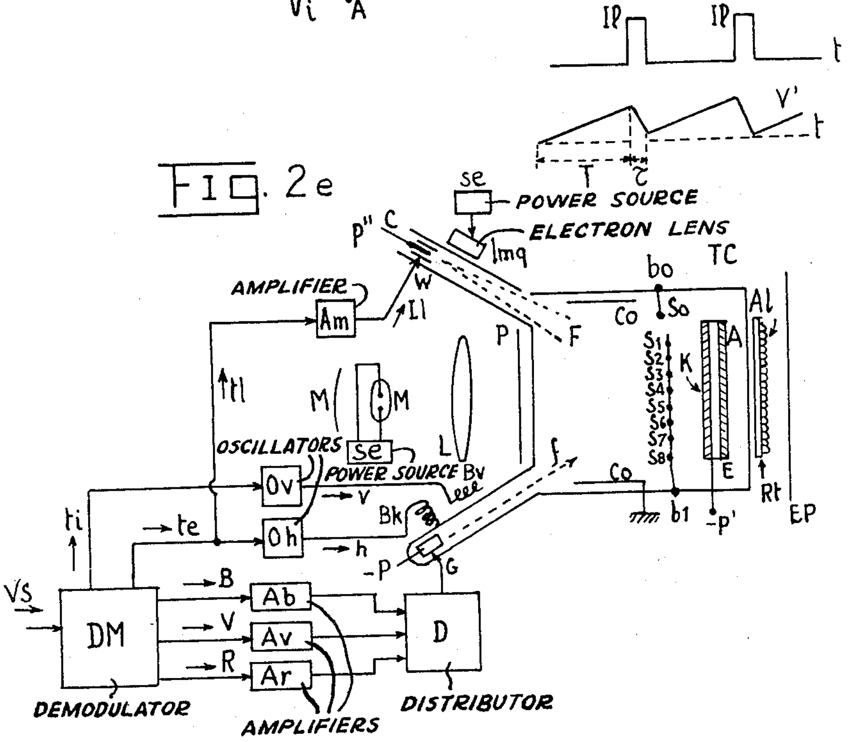
Figure 3:
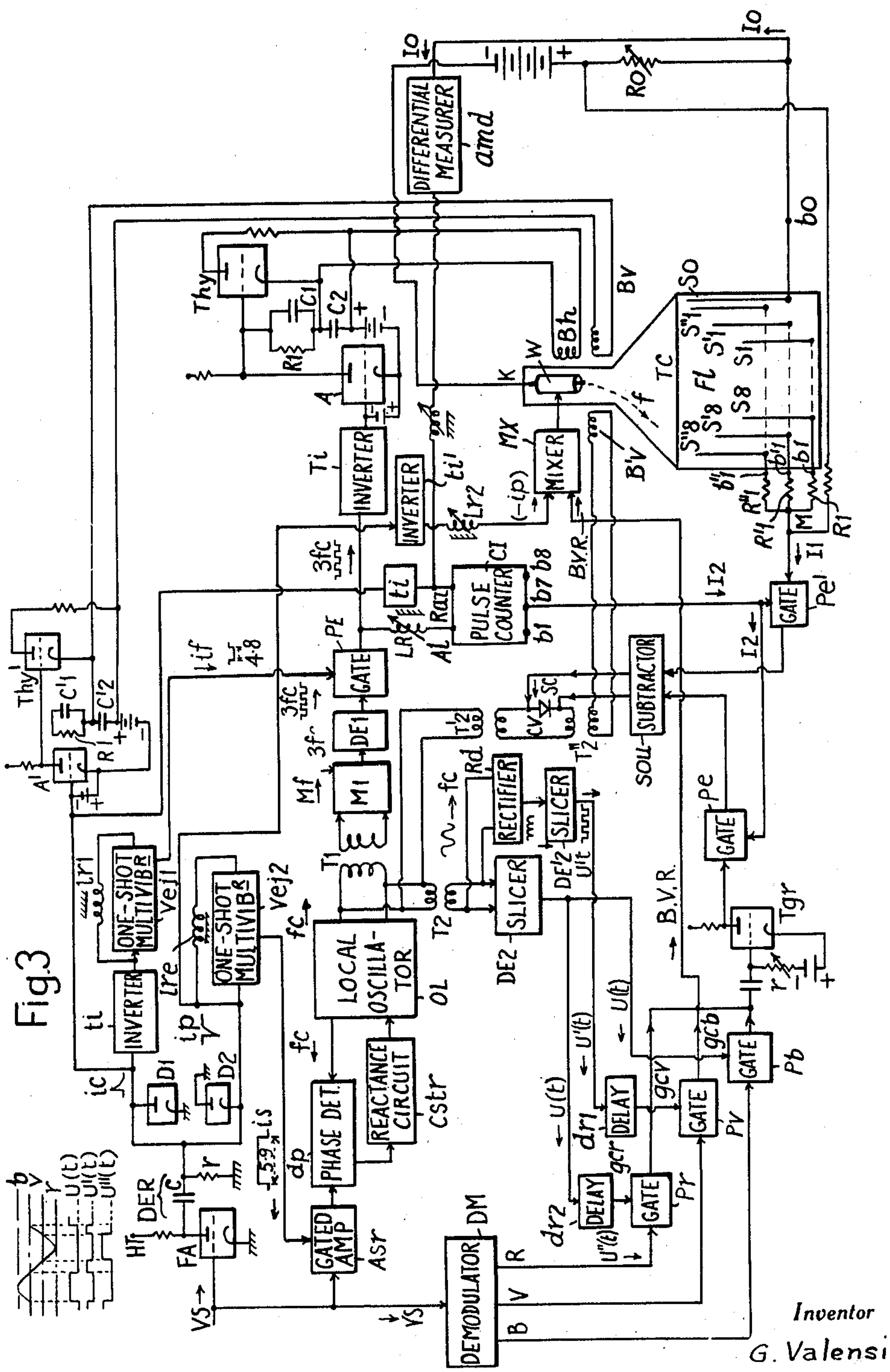

The invention will now be described, by way of example, with reference to the accompanying drawings, in which:

FIGURE 1 represents part of a colour television viewing tube with a fluorescent screen made of triplets of vertical blue, green and red phosphor stripes which are horizontally scanned, and with a few wires marking the geometry of said screen, FIGURE 2 shows the block diagram of a colour television receiver having the viewing tube of FIGURE 1 and including the electronic synchronizing device in accordance with the invention, FIGURE 2*a* illustrates a known method of deriving short pulses marking respectively the beginning and the end of a line synchronizing pulse in television, FIGURE 2*b* is a diagram of a type of pulse counter used in the colour television receiver of FIGURE 2, FIGURE 2*c* represents the characteristic of a transistor used as variable capacitor in the electronic device in accordance with the invention, FIGURE 2*d* represents a pulse delay circuit of a known type, FIGURE 2*e* represents a colour television receiver of a known type for projecting coloured television pictures, in the cathode ray tube of which few wires have been added in order to apply the synchronizing device in accordance with the invention, FIGURE 3 shows a block diagram of a colour television receiver having the viewing tube of FIGURE 3*a* and including the electronic synchronizing device in accordance with the invention, and FIGURE 3*a* represents part of a colour television viewing tube with a fluorescent screen made of triplets of horizontal blue, green and red phosphor stripes horizontally scanned by a wobbling electron beam, and with a few wires marking the geometry of said phosphor screen.

FIGURE 1 represents, at the top, a cross-section (through a horizontal plane) of a colour television viewing tube TC with a fluorescent screen F*l* made of stripes of materials emitting respectively blue (stripe *b*), green (stripe *v*) and red (stripe *r*) fluorescent light; said stripes being perpendicular to the plane of said cross-section of TC. The lower part of this figure represents the projection of the front panel of tube TC upon a vertical plane. Rectangle *a b, c, d* is a curved frame, moulded in glass, through the holes of which are placed:

(1) A thin metallic bare wire S*o* pulled by a spring and brought out of tube TC to an external terminal *bo*;

(2) A thin metallic bare wire, in the form of a zig-zag ($S_1$, $S_2$, $S_3$, $S_4$, $S_5$, $S_6$, $S_7$, $S_8$) and brought out of the tube TC to another external terminal $b_1$. The general shape of frame *abcd* is parallel to the front panel of tube TC bearing the tri colour fluorescent screen F*l* (viewing panel), and said frame is located on plain moulded glass pads *p, p* on the skirt *s* of said viewing panel. These reference points are positioned during panel funnel sealing to pads (not shown on FIGURE 1) located near the sealing edge of the funnel, and which have previously been ground concentric with the inside of the neck. Thus, when the electron gun is sealed into the neck, its position will correspond to the position of the light source used, during the optical alignment of the various parts of the envelope, before final pumping and sealing of the viewing tube TC.

In FIGURE 2, tube TC is shown in perspective as viewed by an observer looking at the front panel, behind which are wire S*o* and the successive segments ($S_1 \ldots S_8$) of the other zig-zag wire, lines $S_0$, $S_1 \ldots S_8$ being parallel to the vertical (blue, green, red) phosphor stripes of the tri-colour fluorescent screen F*l*. These stripes are not shown on FIGURE 2. K is the cathode, W the Wehnelt cylinder, $B_h$ and $B_v$ the coils of the yoke for horizontally and vertically deflecting the beam *f* of electrons emitted by cathode K and accelerated and focused by known devices not shown on FIGURE 2. In order to reduce as much as possible the non-linearity of the horizontal and vertical motions of said electron beam magnetic coils $B_h$ and $B_v$ are energized by devices described hereafter producing sawtooth waves more regular than those obtained with ordinary relaxation-oscillators. In spite of this, there remains some non-linearity particularly in the horizontal scanning motion, due to unavoidable imperfections of magnetic coil $B_h$ or to instability of the electric power source. The purpose of the successive segments ($S_1 \ldots S_8$) of the zig-zag wire brought out to terminal $b_1$ of the tube TC is to correct this remaining non-linearity as explained hereafter. The purpose of wire $S_0$ brought out to terminal $b_0$ is to mark the start of the scanning of one horizontal line of the fluorescent screen of tube TC, and therefore to permit a satisfactory initial framing of the coloured television picture.

In FIGURE 2 is shown the block diagram of a colour television receiver using the viewing tube of FIGURE 1 and the electronic synchronizing device described hereafter in accordance with the invention. VS is the received composite video signal and DM the demodulator deriving from VS the primary coloured signals corresponding to the blue B, green V and red R components of the light produced by the point of the televised scene being scanned, at the considered instant, at the distant television transmitting station. FA is an ampliude-filter separating the line synchronizing pulse at the beginning of each scanning line. It is assumed, as an example only, that, as shown in FIGURE 2*a* which corresponds to the 625 lines French television standards, this synchronising pulse *sy* has a duration of 4.8 microseconds and is followed by a back-porch of 5.9 microseconds during which is received a colour-burst *sr* consisting of a few periods of the colour sub-carrier generated at the distant transmitting station and having an assumed frequency of 4.43 megacycles per second. The duration of the whole scanning line between two beginnings *fav* of such lines (or between two ends *far* of such lines) is assumed to be 64 microseconds. Referring to both FIGURES 2 and 2*a*, the low pass amplitude filter F*a*, followed by the derivating circuit DER (in the mathematical meaning) comprising capacitor *c* and resistor *r*, and further followed by diodes $D_1$ and $D_2$, produce, at the beginning of each line synchronizing pulse *sy*, a short positive electric pulse *ic*, and, at the end of *sy*, a short negative electric pulse *ip*. Pulse *ic*, after inverting triode *ti*, controls the one-shot-vibrator *Vej*1 which is of the Eccles-Jordan type, and which is shunted by a pulse delay means *lr*1 so adjusted that at the output of *Vej*1 is obtained a rectangular negative pulse *if* of 4.8 microseconds for controlling the closing of electronic gate PE which remains normally open. Pulse *ip* controls the one shot vibrator *Vej*2 shunted by a pulse delay means *lr*2 so adjusted that, at the output of *Vej*2, is obtained a positive rectangular pulse *is* of 5.4 microseconds, for controlling the gated-amplifier A*sr* tuned to the frequency *fc* of the colour sub-carrier. This gate A*sr* is normally closed but opens under the control of *is* during the back porch of the line synchronizing pulse *sy*, in order to let the colour burst *sr* reach the phase detector *dp*, to which is also applied the sine wave of frequency *fc* reproduced by local oscillator OL at the receiving station. Block *cs, tr* is a known device including a reservoir capacitor *cs* and a reactance tube *tr* associated with the resonant circuit of oscillator OL. This oscillator is so synchronized both in frequency and in phase (every 64 microseconds) with the colour sub-carrier generator of the distant transmitting station. As explained hereafter, OL is the "basic clock" of the synchronizing device in accordance with the invention.

CI is a pulse-counter of a known type made of ten bistable vibrators and shown on FIGURE 2*b*. A*l* is the input terminal for energizing this counter, and R*az* is the "return to zero" terminal.

The sine wave of frequency *fc* produced by oscillator OL is applied to terminal A*l* of counter CI through transformer $T_1$, frequency multiplier M*f* and electronic slicer $DE_1$, at the output of which is obtained a sequence of rectangular negative pulses (at frequency 3*fc*) passing through electronic gatae PE which is normally open during each scanning line, except during the line synchronizing pulse *sy*.

Mf is for example an harmonic generator comprising a silicon p-n junction inserted in a circuit tuned at frequency $fc$ and acting as a capacitor with a capacity varying as a function of the biasing voltage applied to it. This device further comprises a resonant circuit tuned to frequency $fc$ but any other type of frequency multiplier can be used. $DE_1$ is a band pass amplitude filter acting as an "electronic slicer," and PE is a conventional gated amplifier.

The chain of 10 bistable vibrators ($B_1 \ldots B_{10}$, FIGURE 2*b*) constituting counter CI of FIGURE 2 corresponds to a total number of binary combinations equal to 1024. The combination "zero" is obtained when all the vibrators are in state "0," and the combination "1024" being obtained when all the vibrators are in state "1."

The electronic gate PE is open between the end (*far*, FIGURE 2*a*) of a line synchronizing pulse *sy*, before a picture scanning line, and the beginning (*fav*, FIGURE 2*a*) of the following line synchronizing pulse *sy*, that is during a period of 64−4.8=59.2. microseconds. As the sequence of square pulses energizing counter CI at its input terminal AI has a frequency: $3fc \times 4.43 = 13.29$ megacycles per second, this period (when gate PE is open) corresponds to: $59.2 \times 13.29 = 786.768$, or slightly more than 786 square pulses. Therefore the period T of the cyclic action of counter CI will correspond to the scanning time of 786 picture points, that is not only the effective picture line, but also a number of fictitious points corresponding to the back porch of the line synchronizing pulse (5.9 microseconds). The state of counter CI at the beginning of each period T is shown at the first line of ciphers at the bottom of FIGURE 2*b* and corresponds to the binary combination 237=1023−786. As soon as gate PE opens, counter CI begins to count 786 pulses, and then reaches the state shown at the second line of ciphers at the bottom of FIGURE 2*b*. At the end of period T pulse *ic* (FIGURE 2*a*) inverted by triode *ti* is applied to the return-to-zero terminal *Raz* of counter CI which again takes the state represented by the first line of ciphers at the bottom of FIGURE 2*b*.

During the period T, are obtained at the respective output terminals ($b_9$, $b_8$, $b_7$, $b_6 \ldots$) of counter CI numbers of pulses corresponding to the successive binary numbers (2, 4, 8, 16, 32 . . .), and these pulses are, in each case, equally separated in time. The period T can therefore be divided in equal parts as desired, and so can be obtained a "reference timing" corresponding to each picture scanning line. The sweeping (by electron beam *f* of cathode ray tube TC) of the successive segments ($S_1 \ldots S_8$) of the wire connected to output terminal $b_1$ (FIGURE 2) produces 8 "timing pulses" $I_1$ corresponding to the actual scanning of said picture line. The eight pulses $I_2$ obtained at output terminal $b_7$ of pulse counter CI acting as a "reference." The corresponding 8 timing pulses $I_1$ obtained at output terminal $b_1$ of cathode ray tube TC are, in fact, position modulated pulses. The adjustable pulse delay means LR, inserted between electronic gate PE and the input terminal AI of counter CI, can be so adjusted that a reference $I_2$ always precedes the corresponding pulse $I_1$. These two corresponding pulses are applied to a converter *Cpd* of position modulated pulses into duration modulated pulses, followed by a converter *Cda* of duration modulated pulses into amplitude modulated pulses. At the output of *Cda* is therefore obtained a correcting signal *sc*, of constant polarity, the amplitude of which is a "measure" of the non-linearity of the scanning motion of electron beam *f* inside cathode ray tube TC. If this motion was perfectly linear, the zig-zag wire ($S_1 \ldots S_8$) would not be required and the wire $S_0$ would be sufficient to adjust the initial framing of the television picture as explained hereafter. The more irregularly non-linear is this scanning motion, the greater must be the number of segments (16, 32, 64 . . .) of this zig-zag wire and, consequently, the greater must be the number of parts in which the period T of the cyclic action of counter CI must be divided. In this way is determined the output terminal ($b_6$, $b_5$, $b_4 \ldots$) of counter CI at which the reference timing should be taken. On FIGURE 2, as 8 segments only are shown for the zig-zag wire at the end of which are obtained the timing pulses I. The reference timing (pulses $I_2$) are derived at output terminal $b_7$ of counter CI.

The position duration converter *Cpd* is a bistable vibrator to both sides of which are applied the corresponding pulses $I_1$ and $I_2$. It can also be a capacitor charged by a one shot vibrator controlled by $I_1$, and suddenly discharged by $I_2$.

The duration amplitude converter *Cda* is a blocked pentode followed by an integrating and limiting pentode, constituting a device well known in electronics.

Instead of the arrangement shown on FIGURE 2*b*, counter CI of FIGURE 2 may be of any other known type, provided that it is a quick-operating device adjusted to the particular television standards concerned. For example, use can be made of a counter made of ferroelectric or ferromagnetic memories (matrices obtained by evaporation of appropriate materials upon a glass plate), associated with printed circuits for writing and reading the numerical data stored in said memories (by mutual inductance between said memories and said circuits). The correcting signal *sc* obtained at the output of *Cda* serves to modulate the phase of a sine wave of frequency *fc*, produced by local oscillator OL of the receiving television station (FIGURE 2) through transformer $T_2$, and controlling the gates of 3 gated amplifiers P*b*, P*v*, P*r* through which the 3 primary colour signals B (for blue) V (for green) and R (for red) can reach electronic mixer *mx* sequentially, in order to modulate the intensity of the electron beam *f* striking the tri colour fluorescent screen *Fl* of cathode ray tube TC. For this phase modulation, use is made of a resonant circuit $T_2$, $T_3$ tuned to the colour sub-carrier frequency *fc* and including a silicon p=n junction CV acting as a capacitor, the capacity of which varies in accordance with the amplitude of the correcting signal *sc* applied to it. FIGURE 2*c* shows the corresponding characteristics having for its abscissa the voltage of signal *sc* and for its ordinate the percentage of capacity variation. A linear part of this characteristic, both sides of point M, is utilized. This variable capacitor CV is inserted between the secondary winding of transformer $T_2$ and the primary winding of transformer $T_3$ which energizes an electronic slicer $DE_2$ (band pass amplitude filter). The phase modulated wave $u_1t$ becomes, at the output of $DE_2$, a sequence of rectangular pulses $U_2(t)$ at the frequency *fc* of the colour sub-carrier; the time spacing of these pulses following the time variations of signal corrector *sc*, and, therefore, compensating the non-linearity of the scanning motion of electron beam *f* of cathode ray tube TC. Wave $U_2(t)$ reaches directly the gating grid *gcb* of gated amplifier P*b*, then, after a delay of $1/3fc$ produced by device $dr_1$, the gating grid *gcv* of gated amplifier P*v*, and finally, after a delay of $2/3fc$ produced by device $dr_2$, the gating grid *gcr* of gated amplifier P*r*. Therefore during each period $1/fc$ of the wave $U_2(t)$, the intensity of the electron beam *f* is sequentially modulated by the 3 primary colour signals B, V, R corresponding to the same picture-point. Also, due to the action of the correcting signal *sc*, this electron beam strikes sequentially, at corresponding instants, the blue, green and red stripes of the same triplet of fluorescent screen *Fl* or tube TC. Thus a line of the received colour television picture is reproduced in perfect synchronism with the scanning of the corresponding line of the televised scene at the distant transmitting station.

Between the end of the production of one picture-line and the beginning of the following line, the primary colour signals do not exist (blanking period occupied by the line synchronizing pulse *sy* and the colour burst *sr*). It is precisely during this blanking period that the yoke B*h*, B*v* would position the electrons at the left corner of tube TC, where wire S*o* is located. In order that this wire S*o* can serve for the initial framing of the television picture, the negative pulse *ip*, corresponding to the end of the line synchronizing pulse *sy*, reaches, through an adjustable pulse delay means $lr_3$ and an inverting-amplifier *ti'*, the electronic mixer *mx*, the output of which controls the intensity of the electron beam *f* by means of wehnelt cylinder W. Wire S*o* is, at external terminal *bo*, connected to the positive pole of the high tension battery of tube TC through an adjustable resistor R*o*. *amd* is a differential electrical measuring instrument which receives a negative pulse I*o* produced by electron beam *f* striking wire S*o* on one side, and receives on the other side the negative pulse *ic*, which marks the end of the preceding picture line, through another adjustable delay means $lr_4$. By proper adjustments of $lr_3$ and $lr_4$ it is possible to put at the same time position the two negative pulses *ic* and I*o*. As the amplitude of *ic* is constant, it is possible to equalize these two pulses by a proper adjustment of resistor R*o*. When these results are obtained, the needle of the differential measuring instrument *amd* is at zero, which means that the television picture is framed, on the viewing panel, in front of tube TC, in such a manner that the zig-zag wire ($S_1$ . . . $S_8$) will properly fulfil its duty.

FIGURE 2*d* represents a pulse delay circuit such as LR, $lr_1$, $lr_2$, $lr_3$ or $lr_4$ of FIGURE 2. It comprises a one shot vibrator (double triode $V_1$, $V_2$), at the input A of which is applied the electric pulse *i* to be delayed by a period T. At the output B of said vibrator is produced a rectangular pulse I having a duration T corresponding to the time constant of the output circuit consisting of an adjustable capacitor C and an adjustable resistor R. Between B and B' is a derivating circuit (in the mathematical meaning) consisting of a capacitor *k* in series and a resistor *r* in parallel, and at the output of which are obtained a short negative pulse and a short positive pulse separated in time by T. Further, a rectifier R*d* suppresses the first of these two pulses so that there only remains a pulse *i'* corresponding to pulse *i*, but delayed as desired with reference to *i*. The desired delay T is adjusted by acting on the adjustable capacitor C and resistor R.

In order to reduce to a minimum the non-linearity of the scanning motion of the electron beam *f* of tube TC of FIGURE 2, and particularly the horizontal scanning motion, the yoke is energized by means of the devices shown in FIGURE 2, rather than with ordinary relaxation oscillators.

Magnetic coil B*h*, producing the horizontal scanning of the tri colour fluorescent screen F*l* is energized by the local oscillator OL, through transformer $T_1$, frequency triplet M*f*, electronic slicer $DE_1$ and electronic gate PE; at the output of which is produced a sequence of short negative rectangular pulses at a frequency 3*fc* (*fc* being the frequency of the colour sub-carrier, and also the frequency of triplets of F*l* scanned per/second). These rectangular pulses become positive after the inverting triode T*i* and are then applied to the control grid of amplifier A, in the plate circuit of which are connected an arrangement having a predetermined time constant and made of a resistor $R_1$ in parallel with a capacitor $C_1$, another capacitor $C_2$, and finally the high tension battery of said amplifier A. At each period of the wave of frequency 3*fc*, capacitor $C_2$ receives a supplementary electrical charge. The gradually increasing voltage across the plates of capacitor $C_2$ energizes the magnetic coil B*h*. The parallel arrangement of resistor $R_1$ and capacitor $C_1$ is connected to the input of thyratron T*hy*, which is, for example, a silicon transistor having a negative resistance when the emitter-base voltage exceeds a given threshold. The time constant of ($R_1$, $C_1$) is such that, as long as the flow of short rectangular pulses at frequency 3*fc* continues, this threshold is not exceeded, but when electronic gate PE closes, thyratron T*hy* functions as a short-circuit, and capacitor $C_2$ discharges suddenly. The electron beam *f* inside tube TC returns quickly to the beginning of the following picture scanning line.

Magnetic coil B*v* is energized by a similar device namely: amplifier A' to the input of which are applied the positive pulses *ic* marking the beginning of a scanning line, and thyratron T*hy'*. FIGURE 2*e* represents a colour television receiver of a known type for projecting colour television pictures on a screen EP. In the cathode ray tube TC, K is a target made of ferroelectric crystals on the electro-conductive face of a glass plate E, the other face of which acts as an analyser A crossed with the polariser P located in front of tube TC. When electron pencil *f*, produced by gun G, deflected by B*h* and B*v* energized by relaxation oscillators O*h*, O*v* (respectively synchronized by the received line synchronizing pulses $t_e$ and field synchronizing signals $t_i$), and sequentially intensity modulated by the colour primary signals BVR derived by demodulator DM from the received composite video signals VS, strikes target K, a distribution of birefraction is produced in said ferroelectric crystals, corresponding to the distribution of electrostatic charges upon the bomparded surface of target K. This birefraction, which varies from one point to the other in accordance with the various brightnesses and colours of the different points of the televised scene, modulates the intensity of the white light beam produced by source Σ, energized by electric power source SE, and located at the center of spherical mirror M and also at the focus of collimating lens L. Between tube TC and projection screen EP is a methyl-metachrylate moulded plate having on one face an assembly A*l* of juxtaposed elemental lenses corresponding to the various points of the televised scene, and on the other face, a tri colour filter R*t* made of triplets of blue, green and red stripes perpendicular to the plane of FIGURE 2*e*, a point of one triplet corresponding to one elemental lens, and therefore to one point of the televised scene. All the elemental lenses of A*l* have their focus on projection screen EP. The second cathode of tube TC is shown at *c* and *w* is the corresponding wehnelt cylinder; *co* is the secondary electrons collector. When electron pencil *f* has charged target K in accordance with one field of the television picture linear period T of the vertical scanning wave *v* produced by oscillator O*v* and shown, at the top right of FIGURE 2*e*, the amplifier A*m* energized by the line synchronizing pulse $t_e$ during a short time $\tau$ produces a powerful short positive pulse I*l* which overcomes the negative bias of wehnelt cylinder W. In this way is produced a large spray F of electrons emitted by cathode *c* for discharging the surface of target K. This beam of electrons F is completely defocused by a quadrupolar magnetic electron lens *lmq* energized by electric power source *se*, and therefore covers during the short time $\tau$ between two successive picture fields, the whole surface of target K, which thus acts both as a light intensity modulator, and as an electrostatic memory.

In front of target K, FIGURE 2*e* shows the trace of the wire S*o* and of the successive elements ($S_1$ . . . $S_8$) of the zig-zag wire of FIGURE 1, which are parallel to target K and to the triplets of R*t*, and are consequently perpendicular to the plane of FIGURE 2*e*. S*o* and ($S_1$ . . . $S_8$), brought respectively out of cathode ray tube TC to external terminals $b_0$ and $b_1$, serve for the initial framing of the television picture and for the synchronization of the sampling of the primary colour signals B, V, R by distributor D with the scanning motion of electron pencil *f*, in accordance with the invention, and as explained hereabove with reference to FIGURE 2. The front and back walls of tube TC (parallel to target K) being non-reflecting, and the rays of white light, collimated by lens L, being perpendicular to said front and back walls of TC, there is no detrimental optical parallax effects produced by said walls in spite of their relatively great thickness for resisting to the external air-pressure upon evacuated tube TC.

FIGURE 3 shows the block diagram of a colour television receiver having a viewing tube TC, shown in FIGURE 3*a*, with a fluorescent screen F*l* made of triplets of horizontal blue, green and red phosphor stripes, horizontally scanned by a wobbling electron beam. At the right of the bottom of FIGURE 3*a* are shown two of these triplets *bvr* and, in dotted line, one period of the sine wave followed by the spot produced by said wobbling electron beam on one triplet S, S′, S″ are three enamelled wires close to each other whereas S*o* is a bare thin wire parallel to F*l* at its left hand end. The insulating enamel has been taken off in front of each blue phosphor stripe *b* for wire S, or in front of each green phosphor stripe *v* for wire S′, or in front of each red phosphor stripe *r* for wire S″. At the top of FIGURE 3*a* is shown a cross-section of the viewing tube TC of FIGURE 3 through a horizontal plane, F*l* being the tri colour fluorescent screen. Similarly to FIGURE 1 a moulded glass frame, sealed upon pads *p* located inside the skirt *s* of the viewing panel bearing the fluorescent screen F*l* has 3 sets of holes through which zig-zag the enamelled wires S, S′ and S″, and one hole for the bare wire S*o*. Only the portions between the successive segments ($S_1$, $S_2$ . . . $S_7$, $S_8$) of wire S, and the corresponding portions ($S'_1$, $S'_2$ . . . $S'_7$, $S'_8$) of wire S′, or ($S''_1$, $S''_2$ . . . $S''_7$, $S''_8$) of wire S″, are shown on FIGURE 3*a*. The bare wire S*o* is brought out of tube TC to terminal *bo*, and the enamelled wires (S, S′, S″) are brought out to terminals $b_1$, $b'_1$, $b''_1$ respectively.

At the left of the bottom of FIGURE 3*a* are represented the cathode K, the wehnelt cylinder W and said external terminals $b_1$, $b'_1$, $b''_1$ of viewing cathode ray tube TC. These terminals are connected, by resistors $R_1$, $R'_1$, and $R''_1$ having different resistance-values to a common resistor R, and, further, to the positive pole of the high tension battery of tube TC. The corresponding segments of enamelled wires S, S′, S″ are radially located in front of each other, as shown at the top of FIGURE 3*a*. Therefore the electron pencil strikes the bare portion of either S, or of S′, or of S″, whether it is pointing towards a blue phosphor stripe *b*, or a green phosphor stripe *v*, or a red phosphor stripe *r* of the fluorescent screen F*l*. Therefore, the electric voltage *sc* occurring then at point M would have a value which could directly be used as an information for the whereabouts of the cathode ray spot upon screen F*l* at each instant, if the wehnelt cylinder W remained at a constant potential referred to cathode K, the intensity of the electron beam *f* remaining then constant, and the value of voltage *sc* depending then only on the value of the resistance (of $R_1$, or of $R'_1$, or of $R''_1$) connected to the particular zig-zag wire (S or S′ or S″) struck by electron beam *f* at the considered instant. As, in fact, the primary colour signals B, V, R modulate sequentially the intensity of said electron pencil *f*, account should be taken of these intensity variations in order to be able to use voltage *sc*, produced at point M, as a correcting signal for the desired synchronization between the scanning motion of pencil *f* at the receiving station, and the scanning of the televised scene at the distant television transmitting station. This is done as explained hereafter with reference to FIGURE 3.

In FIGURE 3, as in FIGURE 2, the amplitude filter FA, the derivating circuit DER, the diodes $D_1$, $D_2$, and the vibrators V*ej1*, V*ej2* produce the pulse *ic* corresponding to the beginning of a received line synchronizing pulse *sy*, the pulse *ip* corresponding to the end of said pulse *sy*, the negative rectangular pulse *if* having the duration (4.8 microseconds) of *sy*, for closing electronic gate PE; and the positive rectangular pulse *is* having the duration (5.9 microseconds) of the back-porch of *sy*, during which is transmitted the colour burst *sr*, for opening gated amplifier A*sr*, tuned to the colour subcarrier frequency *fc*, in order to synchronize accurately the local oscillator OL reproducing said colour sub-carrier at the television receiving station. This local oscillator OL energizes the pulse counter CI (through transformer $T_1$, frequency tripler M*f*, electronic slicer $DE_1$ and electronic gate PE) with negative rectangular pulses at a frequency 3*fc*. These pulses are applied, through adjustable pulse delay means LR, to the input terminal A*l* of said pulse counter CI.

Local oscillator OL produces also, through transformer $T_2$, firstly a rectified wave $u'(t)$ (shown at the left of the top of FIGURE 3) at the output of electronic slicer $DE_2$ following rectifier R*d*, and secondly a wave $u(t)$ (shown also at the left of the top of FIGURE 3) at the output of another electronic slicer $DE'_2$. This wave $u(t)$ controls directly the gating grid *gcb* of electronic gate P*b* energized by the (blue) primary colour signal B. After an appropriate pulse delay means $dr_2$, the wave $u(t)$ becomes the wave $u''(t)$ (represented also at the left of the bottom of FIGURE 3) which controls the gating grid *gcr* of electronic gate P*r* energized by the (red) primary colour signal R. The wave $u'(t)$, has a frequency 2*fc* whereas $u(t)$ and $u''(t)$ have the frequency *fc*, controls the gating grid *gcv* of electronic gate P*v* energized by the (green) primary colour signal V, after an appropriate delay produced by pulse delay means $dr_1$. The 3 primary colour signals B, V, R control therefore sequentially, through electronic mixer *mx*, by means of wehnelt cylinder W, the intensity of the beam *f* of the electrons emitted by cathode K of cathode ray tube TC (shown also on FIGURE 3*a*) having a fluorescent screen F*l* in front of which are located bare wire S*o* and enamelled wires ($S_1$ . . . $S_8$), ($S'_1$ . . . $S'_8$) and ($S''_1$ . . . $S''_8$), said wires being vertical whereas the blue, green and red phosphor stripes constituting screen F*l* are horizontal and are scanned horizontally by electron beam *f*. The spot produced by said electron beam on screen F*l* has firstly a horizontal linear motion controlled by magnetic coil B*h* energized by oscillator CL through device A, T*hy*, secondly a vertical linear motion controlled by magnetic coil B*v* energized by the successive pulses *ic* through device A′, T*hy*′, and thirdly a wobbling motion, superimposed upon said horizontal linear motion, and controlled by magnetic coil B*v* energized by local oscillator OL through transformers $T'_2$ and $T''_2$. The secondary winding of $T'_2$ is in series with a transistor CV acting as variable capacitor and with the primary winding of $T''_2$. A correcting signal *sc* applied across the terminals of CV is provided by the enamelled wires S, S′, S″ within tube TC in the form of periodic timing pulses $I_1$ produced at the common point M connected to said enamelled wires by resistors of different resistance values $R_1$, $R'_1$, $R''_1$. These timing pulses $I_1$ reach electronic subtractor *sou* through an electronic gate *pe*′ opened shortly, at regular intervals, by the successive pulses $I_2$ obtained at output terminal $b_7$ of pulse counter CI and dividing, into 8 equal parts, the period of cyclic operation of counter CI, which is energized by local oscillator OL through adjustable pulse delay means LR, as explained hereabove with reference to FIGURE 2. As already stated above, it is necessary to correct the intensity of each of these pulses $I_1$, taking into account the intensity of electron beam *f* at the same instant. This is done automatically by the triode T*gr*, the grid of which is sequentially submitted to the action of the primary colour signals B, V, R, and has an appropriate bias adjusted through variable resistor *r*, whereas the plate is connected to electronic subtractor *sou* through electronic gate *pe*, which is opened by pulse $I_2$ at the same instant as electronic gate *pe*′. Under the control of connecting signal *sc*, produced at the output of said subtractor *sou* and applied to variable capacitor *cv*, the phase of the sine wave at frequency *fc* energizing magnetic coil $B_v$′ is always properly modulated, and therefore the proper wobbling motion is secured for the electron beam *f* of tube TC, in spite of the unavoidable non-linearity of the horizontal scanning motion controlled by magnetic coil B*h*. The correct phosphor stripe (blue *b*, or green *v*, or red *r*) is always struck by this electron beam, and a good coloured picture of the televised scene is obtained on fluorescent screen F*l* of tube TC, FIGURE 3. As explained for FIGURE 2, the initial framing of said coloured picture is carried out by means of a differential measuring instrument *amd* under the control of pulse I*o* collected by bare wires S*o* within tube TC, and after a proper adjustment of resistor *Ro*, and pulse delay means *lr*3 and *lr*4. While the invention has been illustrated and described as hereabove, it is not intended to be limited to the details shown, since various modifications and structural changes may be made without departing in any way from the scope of the invention. Without further analysis the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

I claim:

1. Device for synchronizing a colour television receiver having a cathode ray tube with a tri colour viewing panel made of successive blue, green and red stripes scanned by the electron beam, comprising:

inside said tube, in front of and parallel to said viewing panel, a few metallic wires marking the geometry of said panel and brought out to external terminals where are produced when said electron beam strikes said wires, on the one hand a pulse for processing the initial framing of the received television pictures and on the other hand timing pulses providing periodical information concerning the imperfections of the scanning motion of said electron beam;

a local oscillator reproducing the colour sub-carrier, and maintained, by the received colour burst, at the same frequency and phase as the sub-carrier generator of the distant transmitting station, said oscillator acting as basic clock for synchronizing said colour television receiver;

a pulse counter energized by said local oscillator for producing reference pulses marking periodically the geometry of the televised scene because the frequency and phase of said colour sub-carrier are in close correlation with the scanning of said scene at the distant transmitting station;

an electronic sampler energized by said local oscillator for modulating the intensity of said electron beam sequentially by the three primary colour signals derived from the received composite video signals;

and an electronic pulse comparator receiving simultaneously said timing pulses and said reference pulses, and producing a signal for correcting the imperfections of the scanning motion of said electron beam, said pulse comparator and said sampler acting together so that, at each given instant, said electron beam, positioned on a blue, or on a green, or on a red stripe of said viewing panel, has precisely an intensity proportional to the intensity of the corresponding blue, or green, or red component of the light emitted by the point of the televised scene being scanned at said instant.

2. Device in accordance with claim 1 for synchronizing a colour television receiver having a viewing panel made of successive blue, green and red vertical stripes scanned horizontally by the electron beam, comprising:

inside said tube, in front of and parallel to said viewing panel, a simple vertical metallic wire at the edge of said panel, and another metallic wire in the shape of a zig-zag with successive segments parallel to said vertical stripes, said wires being held by a moulded glass frame sealed to the glass envelope of said tube;

an electronic circuit energized by the received composite video signals and including an amplitude filter, a derivating triode and two diodes for deriving short pulses marking the beginning and the end of the received line synchronizing pulse, said short pulses controlling respectively a first vibrator producing a negative rectangular pulse having the duration of said line synchronizing pulse and a second vibrator producing a positive rectangular pulse having the duration of the back-porch which follows said line synchronizing pulses;

a first gated amplifier at the colour sub-carrier frequency, and the gating grid of which is controlled by said second vibrator for opening the way to the colour burst towards said local oscillator reproducing the colour sub-carrier;

a second gated amplifier inserted in the circuit by which said local oscillator energizes said pulse counter, and the gating grid of which is negatively biased by said first vibrator while said counter returns to its zero setting;

a pulse comparator receiving simultaneously the timing pulses collected by said zig-zag metallic wire parallel to said viewing panel, and said reference pulses produced at the output of said pulse counter, and comprising a converter of position modulated pulses into duration modulated pulses, which are further transformed, by a following duration amplitude converter, into pulses of variable amplitude constituting said correcting signal;

and a resonant circuit energized by said local oscillator and tuned at the colour sub-carrier frequency, and including a phase modulator controlled by said correcting signal, for timing properly said sampler which sequentially modulates the intensity of said electron beam.

3. Device in accordance with claim 1 for synchronizing a colour television receiver having a viewing panel made of successive blue, green and red horizontal stripes horizontally scanned by a wobbling electron beam, comprising;

inside said tube, in front of and parallel to said viewing panel, a simple vertical metallic wire at the edge of said panel, and three partly enamelled metallic wires in the shape of a zig-zag with successive vertical segments and located behind each other, said wires being held by a moulded glass frame sealed to the glass envelope of said tube;

an electronic circuit energized by the received composite video signals and including an amplitude filter, a derivating triode and two diodes for deriving short pulses marking the beginning and the end of the received line synchronizing pulse, said short pulses controlling respectively a first vibrator producing a negative rectangular pulse having the duration of said line synchronizing pulse, and a second vibrator producing a positive rectangular pulse having the duration of the back-porch which follows said line synchronizing pulse;

a first gated amplifier tuned at the colour sub-carrier frequency and the gating grid of which is controlled by said second vibrator for opening the way to the colour burst towards said local oscillator reproducing the colour sub-carrier;

a second gated amplifier inserted in the circuit by which said local oscillator energizes said pulse counter, and the gating grid of which is negatively biased by said first vibrator while said counter returns to its zero setting;

a pulse comparator including an electronic subtractor which, on the one hand, receives, through an electronic gate controlled by said reference pulses, the timing pulses of varying amplitude collected by said zig-zag metallic wires and, on the other hand, the successively sampled primary colour signals through another electronic gate simultaneously controlled by said reference pulses, said electronic subtractor producing, at its output, said correcting signal;

a resonant circuit energized by said local oscillator and tuned at the colour sub-carrier frequency, and including a phase modulator controlled by said correcting signal;

and a magnetic coil, inductively coupled with said resonant circuit, for producing the wobbling superimposed on the horizontal scanning motion of said electron beam.

4. In a device in accordance with claim 2, a differential measuring instrument for processing the initial framing of the received colour television picture, to which are applied, on the one hand, the pulse collected by said simple metallic wire at the edge of said viewing panel, and on the other hand, the short pulse marking the beginning of each picture scanning line.

5. In a device in accordance with claim 2, generators of very linear sawtooth waves for energizing the magnetic coils deflecting horizontally and vertically said electron bear, each generator comprising: a triode having, in its plate circuit, a first capacitor in series with a resistor in parallel with a second capacitor, and a thyratron, the grid of which is biased by said resistor in parallel with said second capacitor, whereas its plate circuit shunts said first capacitor, whereby the voltage across the plates of said first capacitor increases linearly and continuously as long as the grid of said triode is energized by successive positive pulses, but drops suddenly when the sequence of said positive pulses is interrupted, and these positive pulses being derived from the reproduced colour subcarrier for feeding the generator energizing said horizontally deflecting magnetic coil, and being derived from the received line synchronizing pulses for feeding the generator energizing said vertically deflecting magnetic coil.

No references cited.